(12) United States Patent
Legner

(10) Patent No.: US 6,619,184 B1
(45) Date of Patent: Sep. 16, 2003

(54) HYDRAULIC RADIAL PISTON MOTOR

(75) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 5 days.

(21) Appl. No.: 10/110,602

(22) PCT Filed: Nov. 14, 2000

(86) PCT No.: PCT/EP00/11212
§ 371 (c)(1),
(2), (4) Date: Apr. 11, 2002

(87) PCT Pub. No.: WO01/36818
PCT Pub. Date: May 25, 2001

(30) Foreign Application Priority Data

Nov. 19, 1999 (DE) .......................... 199 55 965

(51) Int. Cl.$^7$ .................................. F01B 1/06
(52) U.S. Cl. ............... 91/491; 91/476; 60/436
(58) Field of Search .......... 91/491, 476, 489; 60/436, 441, 425, 483

(56) References Cited

U.S. PATENT DOCUMENTS

| | | | | |
|---|---|---|---|---|
| 3,403,599 A | | 10/1968 | Guinot ......................... | 91/205 |
| 3,593,621 A | | 7/1971 | Praddaude ................... | 91/498 |
| 5,186,094 A | | 2/1993 | Allart .......................... | 91/491 |
| 5,199,525 A | * | 4/1993 | Schueler ..................... | 60/425 |
| 5,224,411 A | * | 7/1993 | Fillion ........................ | 91/525 |
| 5,435,135 A | | 7/1995 | Lallier et al. ................. | 91/491 |
| 5,836,231 A | * | 11/1998 | Leinonen .................... | 91/491 |
| 6,038,859 A | | 3/2000 | Mangano et al. ............ | 60/436 |
| 6,186,262 B1 | | 2/2001 | Mann et al. ................. | 180/308 |
| 6,199,377 B1 | | 3/2001 | Allart et al. .................. | 60/439 |

FOREIGN PATENT DOCUMENTS

| | | |
|---|---|---|
| DE | 64 356 | 10/1968 |
| DE | 1 905 455 | 8/1969 |
| DE | 15 28 541 | 1/1974 |
| DE | 15 28 519 | 6/1975 |
| DE | 44 19 665 A1 | 12/1994 |
| DE | 196 24 534 A1 | 1/1998 |
| DE | 196 37 570 A1 | 3/1998 |
| EP | 0 957 210 A | 11/1999 |
| EP | 0 969 205 A1 | 1/2000 |
| FR | 1411047 | 6/1964 |
| FR | 2 678 322 | 12/1992 |
| GB | 1065227 | 4/1967 |

* cited by examiner

Primary Examiner—Charles G. Freay
Assistant Examiner—Michael K. Gray
(74) Attorney, Agent, or Firm—Davis & Bujold, P.L.L.C.

(57) ABSTRACT

In order to reduce the shock that occurs in downshifting and up-shifting a hydraulic radial piston engine, a valve (1), which controls the displacement of the radial piston engine, is reversed with throttling. In order to prevent the throttled reversal from being affected by the level of pressure in the hydraulic fluid intake (3) to the hydraulic radial piston engine, a sealing point is provided in the valve (1), which controls the hydraulic fluid intake (3) to the torque-generating pistons. To prevent critical safety situations from arising, a valve (24) is positioned in front of the valve (1) that controls the displacement of the hydraulic radial piston engine; this valve (24) always switches the valve (1) that controls the displacement of the hydraulic radial piston engine, without pressure, when the hydraulic fluid intake (3) from a hydraulic fluid source to the hydraulic radial piston engine falls below a certain pressure level.

10 Claims, 4 Drawing Sheets

HYDRAULIC RADIAL PISTON MOTOR

FIELD OF THE INVENTION

The invention relates to a hydraulic radial piston engine.

BACKGROUND OF THE INVENTION

Radial piston engines, preferably externally mounted, slow-running radial piston engines that generate high levels of torque can be designed as dual-range engines, in which all the torque-generating pistons can be acted upon by hydraulic fluid from a pump, hence the hydraulic engine is operated at maximum absorption volume, at which it will produce a maximum amount of torque, while the rpm is decreased; on the other hand, it is also possible to operate the hydraulic engine with only a portion of the torque-generating pistons, in which a portion of the torque-generating pistons remain connected to the flow of hydraulic fluid from the pump, while another portion of the torque-generating pistons are connected to the flow of hydraulic fluid back to the pump or to the hydraulic fluid reservoir. In this operating condition the hydraulic engine generates a lower level of torque at the same level of pressure, however it can generate a higher rpm while the capacity of the pump remains the same.

In German Patent Specification 19 05 455, a hydrostatic radial piston engine is disclosed, which is equipped with a valve that connects the flow of hydraulic fluid from the pump to all the torque-generating pistons; when this valve is reversed, a portion of the torque-generating pistons become connected to the return flow of hydraulic fluid, hence the hydraulic engine is operating with only a portion of the torque-producing pistons, causing it to generate a higher rpm and lower torque. The valve is switched over by hydraulic fluid acting on a piston of the valve, shifting it against the force of a spring, or if the piston is pre-stressed against the spring, the valve is switched over in that the hydraulic fluid that acts on the piston is connected to a hydraulic fluid reservoir, hence the spring forces the piston back to its initial position. With transmissions of this type, a portion of the torque-generating pistons is suddenly connected to either the hydraulic fluid intake or the hydraulic fluid return flow. Since the speed of the drive is not able to adjust to this new situation as quickly, a severe shifting shock is created In DE 196 37 570 A1 a hydrostatic-mechanical wheel drive is disclosed, in which a hydraulic radial piston engine drives an inner, central gear of a planetary gear set. The hydraulic piston engine can be slowed via a brake, which is hydraulically lifted and is closed via spring resistance, and always becomes engaged when the hydraulic fluid in the fluid intake drops below a certain pressure level. In order to keep the brake from becoming engaged if the pressure level in the hydraulic fluid intake drops briefly below the pre-defined pressure level, the spring must force the hydraulic fluid against a throttle. If a hydraulic engine is used to drive a mobile construction vehicle, such as an excavator, as is disclosed in DE 196 37 570 A1, critical safety situations may result if an automatic valve control system is used to connect some or all of the torque-generating pistons to the hydraulic fluid intake. If the hydraulic drive system is equipped with an automatic shifting device, which, when a previously established level of pressure in the intake of hydraulic fluid from the hydraulic pump to the hydraulic engine is exceeded, shifts the displacement switchover valve such that all of the torque-generating pistons are connected to the hydraulic fluid intake, and, if the hydraulic fluid intake falls below this previously established level of pressure, the shifting device reverses the displacement switchover valve so that only some of the torque-generating pistons are connected to the hydraulic fluid intake, then when the vehicle is traveling uphill, when the level of pressure in the hydraulic fluid intake is above the established pressure level, the hydraulic engine will operate at its maximum absorption volume. The displacement switchover valve is thus reversed, such that all of the torque-generating pistons are connected to the hydraulic fluid intake. If the driver reduces the flow of hydraulic-fluid from the pump to the hydraulic engine, in order to come to a stop on an incline, then the level of pressure in the hydraulic fluid intake to the engine will drop, so that the displacement switchover valve is reversed, and only a portion of the torque-generating pistons are connected to the hydraulic fluid intake. Because the brake is opened by force of pressure and closed by force of a spring, when the brake is closed, which occurs automatically when the pressure in the intake to the hydraulic engine drops below a predefined pressure level, then hydraulic fluid must be forced out of the brake actuating device. In order to prevent the brake from becoming engaged automatically with only a very brief drop in pressure, the hydraulic fluid in the brake-actuating device must be forced against a throttle position, causing the brake to engage at a delay. However, because switching the hydraulic fluid intake from all of the torque-generating pistons to only a portion of the torque-generating pistons creates a situation in the displacement switchover valve in which all of the torque-generating pistons are directly connected to the hydraulic fluid return flow, but the brake has not become engaged, the construction vehicle will roll down the hill until the brake is engaged, or until the connection is closed again. This can lead to critical safety situations. If the construction vehicle comprising an automatic shifting device, in the case of which below a certain pressure level only a portion of the torque-generating pistons are connected to the hydraulic fluid intake, moves downhill and if the driver of the construction vehicle reduces the flow of hydraulic fluid to the hydraulic engine in order to brake the vehicle, then the hydraulic engine is able to generate a maximum braking moment with only a portion of the torque-generating pistons with the pressure level of the brake valve or pressure limiting valve. This can result in a critical safety situation.

SUMMARY OF THE INVENTION

The object of the present invention is to create a hydraulic radial piston engine in which the shifting shock that occurs when the hydraulic fluid intake is switched from all of the torque-generating pistons to a portion of the torque-generating pistons, or when the hydraulic fluid intake is switched from a portion of the torque-generating pistons to all of the torque-generating pistons, is reduced, and in which no critical safety situations can occur in the operation of the hydraulic radial piston engine.

According to the invention, the valve that connects the torque-generating pistons to the hydraulic fluid intake is actuated via hydraulic fluid, the inward and outward flow of which is throttled, hence the throttled valve is forced against a spring tension, or the throttled valve is forced by the spring tension against the hydraulic fluid that is flowing off. Because the valve controls the inflow of hydraulic fluid to the pistons, and is itself reversed by throttled hydraulic fluid flowing in or out, a sealing point must be positioned between the hydraulic fluid intake to the hydraulic engine or the pistons and the actuating chamber for the hydraulic fluid of the valve, since otherwise hydraulic fluid could drain out of the hydraulic fluid intake to the hydraulic engine or to the pistons, via a gap in the valve actuating chamber, and could thus negatively affect the throttled actuation of the valve. The throttling point in the intake and the return for actuating the valve that connects the torque-generating pistons to the hydraulic fluid supply can have a defined value, or can be adjustable based upon operating parameters, such as the temperature of the hydraulic fluid or rpm. Preferably, the piston of the valve that connects the torque-generating pistons with the hydraulic fluid intake is designed such that when the valve is reversed from a first position to a second position, the cross-section, which connects or divides the two portions of torque-generating pistons, changes almost evenly over the shifting path of the piston, so that no sudden change in the cross-section of the flow of hydraulic fluid will occur; hence, undesirable shifting pressure is prevented. This is preferably realized in that the sides of the connecting grooves in the valve piston are designed as tapered surfaces, or are equipped with grooves, which are shaped such that the cross-section changes almost evenly with the shifting of the piston. The valve piston must be designed such that the cross-section changes nearly evenly with a shift from all of the torque-generating pistons to a portion of the torque-generating pistons, and with a shift from a portion of the torque-generating pistons to all of the torque-generating pistons. The valve that connects the torque-generating pistons to the hydraulic fluid intake is preferably positioned coaxially in a hydraulic fluid intake that supplies hydraulic fluid to a piston carrier. Thus the valve is housed in a structural chamber of the hydraulic radial piston engine that otherwise would be unused. It is also possible, however, for the valve that connects the torque-generating pistons with the hydraulic fluid intake to be positioned outside of the radial piston engine in order to reverse the displacement of the hydraulic radial piston engine. The valve that connects the torque-generating pistons with the hydraulic fluid intake is preferably reversed via spring tension such that when the flow of hydraulic fluid to the hydraulic radial piston engine drops below a certain pressure level, all of the torque-generating pistons become connected to the hydraulic fluid intake. This serves to ensure that, if there is a defect in the hydraulic fluid intake, the hydraulic radial piston engine can be operated with all of its torque-generating pistons, and thus at its maximum torque for the purpose of reversing the valve. Preferably, the hydraulic radial piston engine is connected via a planetary gear set to a wheel drive for a tracked vehicle, preferably an excavator, however it can also be directly connected to the driven shaft. This serves to ensure that with a compact wheel drive, sufficient torque will be generated. Because the piston carrier of the hydraulic engine is connected to a brake, the braking torque is intensified via the planet stage. To ensure that no critical safety situations can occur, a valve is positioned in front of the hydraulic fluid intake to the valve that is used to reverse the displacement of the radial piston engine; this additional valve is held in an initial position by force of spring tension, until the pressure in the hydraulic fluid intake to the hydraulic radial piston engine exceeds a certain level. When this valve is in its initial position, the hydraulic fluid intake for reversing the valve designed to connect the torque-generating pistons to the supply of hydraulic fluid is interrupted. This serves to ensure that below a certain pressure level in the hydraulic fluid intake to the hydraulic engine, all of the torque-generating pistons are constantly connected to the hydraulic fluid intake. This ensures that in the case of an intentional braking process when the vehicle is traveling downhill the hydraulic engine will brake with all of the torque-generating pistons against the brake valve or the pressure control valve. If the vehicle is to be stopped while driving uphill, and if in driving up the hill all of the torque-generating pistons are connected to the supply of hydraulic fluid in order to generate maximum torque, then even when the vehicle is held in a stationary position on a hill, all of the torque-generating pistons will remain connected to the hydraulic fluid intake, without causing an undesired shift, thus keeping the vehicle stationary on the hill until the brake has been engaged. In this, the level of pressure required to actuate the valve to reverse the displacement switchover valve is above the level of pressure required to lift the brake. Because the valve for reversing the valve that connects the torque-generating pistons with the hydraulic fluid supply is positioned in the hydraulic fluid intake, any shifting while the vehicle is stopped on the hill is prevented, independent of a manual or automatic shift command by the driver. Because this valve is positioned in front of the valve that connects the torque-generating pistons to the hydraulic fluid intake, this valve is preferably equipped with the throttle points through which the hydraulic fluid flows, in order to reverse the valve that connects the torque-generating pistons with the hydraulic fluid intake. If the hydraulic radial piston engine has a brake, then the pressure that lifts the hydraulic brake is also preferably used to reverse the valve that is positioned in front of the valve that connects the torque-generating pistons to the hydraulic fluid intake. This offers the advantage that no additional valve that constantly stems the flow of hydraulic fluid is necessary.

Because the flow of hydraulic fluid that controls the valve that connects the torque-generating pistons to the hydraulic fluid intake is throttled in its inward and its outward flow, and because it is guaranteed via a sealing point that this throttled inward and outward flow will not be negatively affected by any external hydraulic fluid, any undesirable shifting shock is prevented with an upward or downward shift. Because the valve that connects the torque-generating pistons to the hydraulic fluid intake is preceded by a valve, which, when the flow of hydraulic fluid to the hydraulic engine drops below a certain pressure level, interrupts the flow of hydraulic fluid that controls the valve that connects the torque-generating pistons to the hydraulic fluid supply, it can be ensured that, when the flow of hydraulic fluid to the hydraulic engine drops below a certain pressure level, all of the torque-generating pistons will be connected to the flow of hydraulic fluid to the hydraulic engine. In this manner, critical safety conditions are prevented.

BRIEF DESCRIPTION OF THE DRAWINGS

The invention will now be described, by way of example, with reference to the accompanying drawings in which.

DETAILED DESCRIPTION OF THE INVENTION

Figure 1:
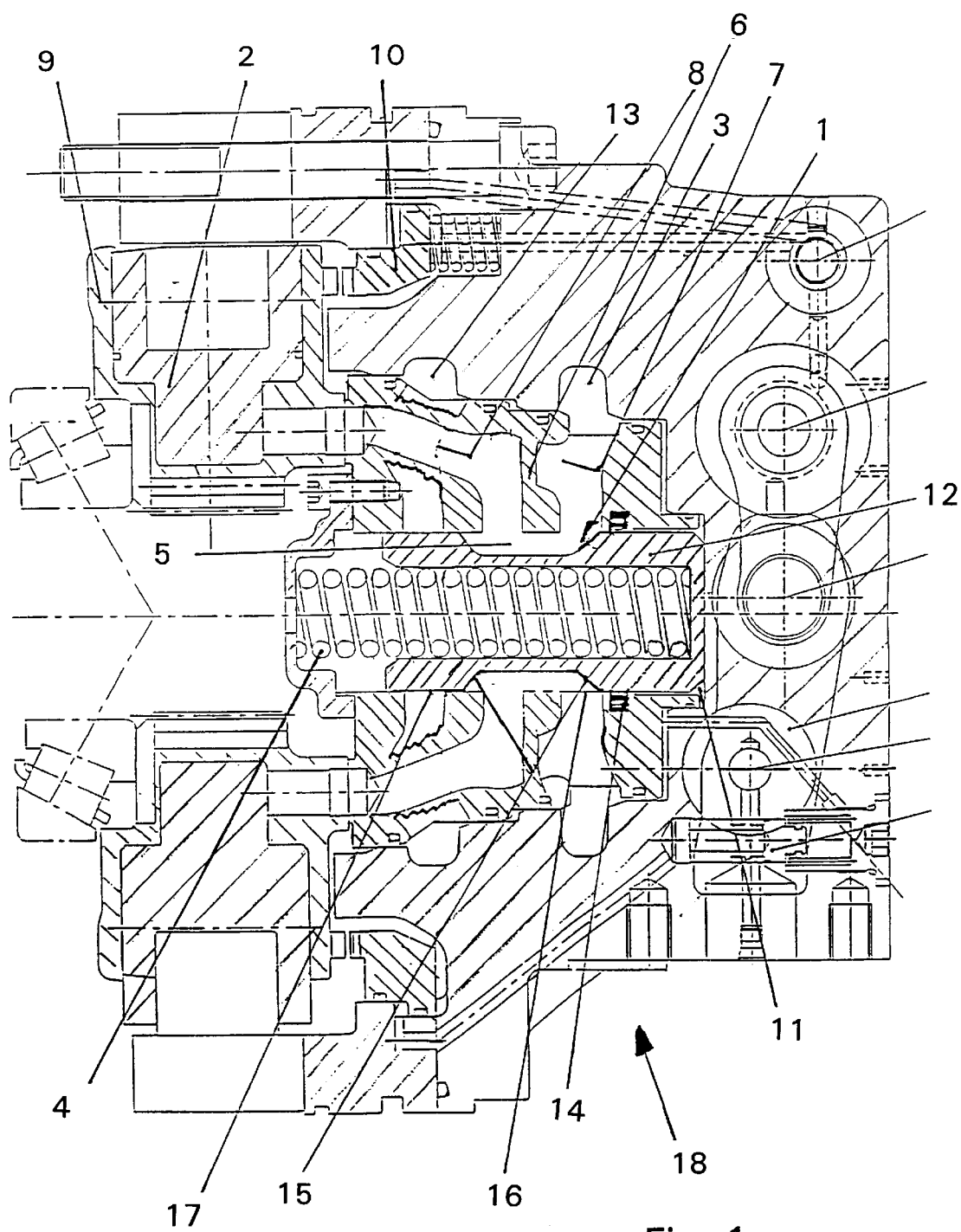
FIG. 1 a cross-section of a hydraulic engine.
Figure 2:
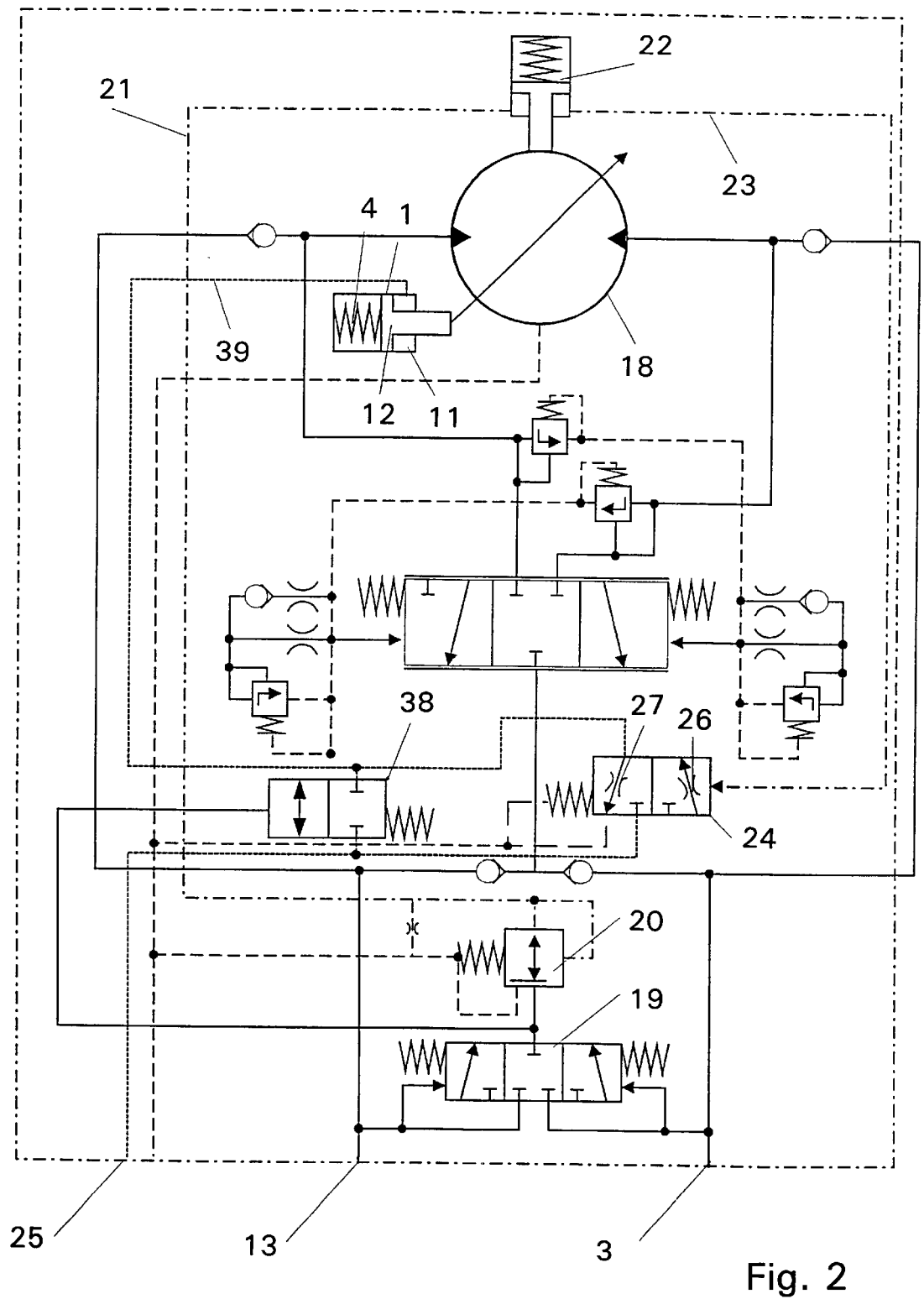
FIG. 2 a hydraulic diagram of the hydraulic engine.
Figure 3:
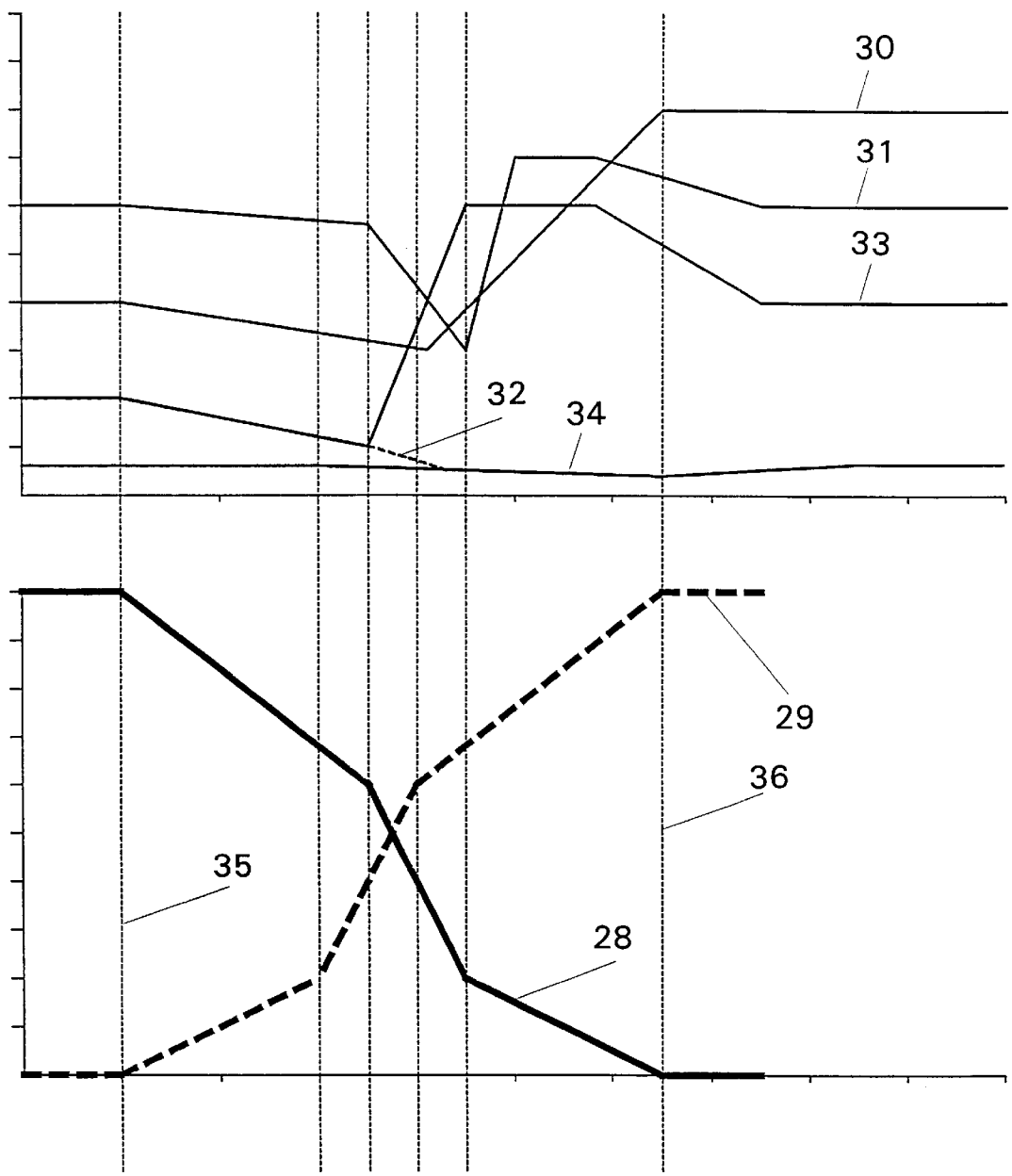
FIG. 3 a diagram illustrating a shift in the connection of the flow of hydraulic fluid from all the torque-generating pistons to a portion of the torque-generating pistons, and FIG. 4 a diagram illustrating a shift in the connection of the flow of hydraulic fluid from a portion of the torque-generating pistons to all the torque-generating pistons.
Figure 4:
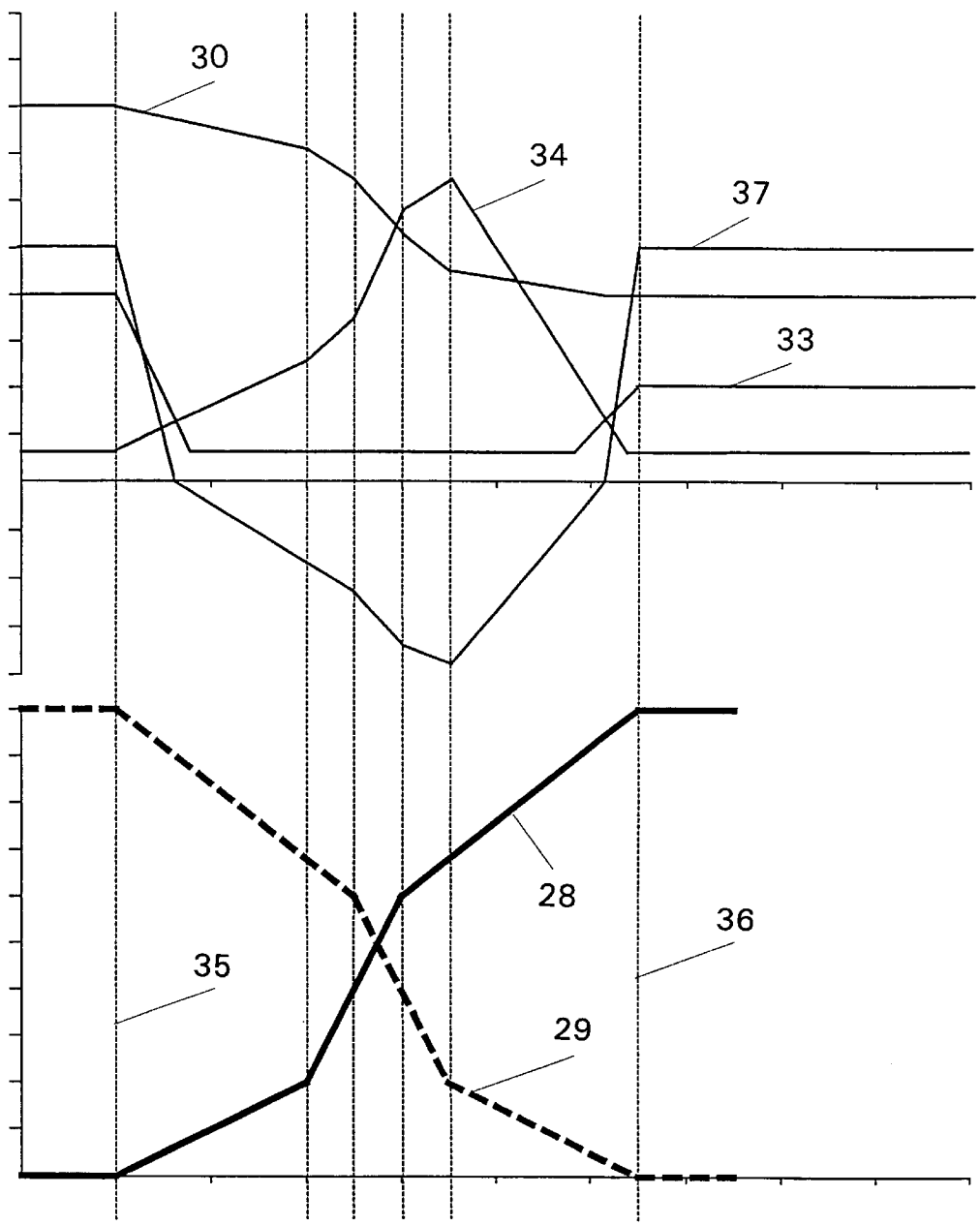

FIG. 1:

A valve 1 that connects the torque-generating pistons 2 to the hydraulic fluid intake 3 is held in its initial position by force of a spring 4, below a certain pressure level. In this initial position, a connection in the hydraulic fluid divider 6 is produced via a recess 5, in which a first portion 7 of the torque-generating pistons and a second portion 8 of the torque-generating pistons are supplied with hydraulic fluid, so that all of the torque-generating pistons are connected to the hydraulic fluid intake 3. In this position, the hydraulic engine generates its maximum torque. The piston carrier 9 can be held in a stationary position, without rotation, by a brake 10. When hydraulic fluid flows into the chamber 11, the piston 12 of the valve 1 is shifted against the force of the spring 4, and the second portion 8 of the torque-generating pistons are connected to the hydraulic fluid return flow 13, so that only the first portion 7 of the torque-generating pistons are acted upon by hydraulic fluid, and will generate torque. If a sealing point 14 is positioned between the hydraulic fluid intake 3 and the chamber 11, hydraulic fluid can flow throttled into and out of the chamber 11, thus controlling the movement of the piston 12, without any negative effects from additional hydraulic fluid from the hydraulic fluid intake 3, which could otherwise enter the chamber 11. The sides 15 of the piston 12 are designed such that the cross-section 16 and the cross-section 17 change nearly evenly with the movement of the piston 12. The throttled shifting of the piston 12 and the nearly even change in the cross-sections 16 and 17 serve to prevent any shifting shock. If the hydraulic radial piston engine is to be moved in the opposite direction, then the hydraulic fluid return flow 13 and the hydraulic fluid intake 3 are reversed, so that the hydraulic fluid flows into the hydraulic fluid return flow 13, and flows out via the hydraulic fluid intake 3.

FIG. 2:

Hydraulic fluid flows into the hydraulic engine 18 via the hydraulic fluid intake 3, and flows back from the hydraulic engine 18 via the hydraulic fluid outlet 13. Via a valve 19, a valve 20 is constantly connected to the hydraulic fluid intake, wherein the valve 20 serves to control the level of pressure. Via the line 21, when there is existing pressure on the hydraulic fluid intake 3, the brake 22 is lifted and thus disengaged. Via a line 23, a valve 24 is controlled, and a line 25 is connected to a chamber 11 of a valve 1, which connects torque-generating pistons to the hydraulic fluid intake 3, thus controlling the absorption volume of the hydraulic engine 18. In the valve 24 a throttle 26 is in the intake position and a throttle 27 is in the outlet position. The throttle 26 is preferably larger than the throttle 27, in order to delay shifting from maximum absorption volume to minimum absorption volume during braking. The valve 1 is controlled such that when the chamber 11 is free from pressure, the spring 4 forces the piston 12 into its initial position, hence all the torque-generating pistons of the hydraulic radial piston engine 18 are connected to the hydraulic fluid intake 3. An automatic valve may be connected to the line 25, which, when the hydraulic fluid intake 3 drops below a certain pressure level, supplies the line 25 with hydraulic fluid, thus reversing the valve 1, so that only a portion of the torque-generating pistons are connected to the hydraulic fluid intake 3, thereby turning the hydraulic engine 18 at a higher rpm, and generating lower torque; when the level of pressure in the hydraulic fluid intake 3 rises above a certain level, this automatic valve then shifts the line 25 without pressure, in order to reverse the valve 1, so that all of the torque-generating pistons are connected to the hydraulic fluid intake 3, hence the hydraulic engine 18 generates a maximum torque, but a lower rpm. It is also possible for the line 25 to be connected to a manual shift device, via which the driver can fill the line 25 with hydraulic fluid, or switch the pressure off. Because the valve 24 is positioned in front of the valve 1, critical safety situations are prevented. If the vehicle is equipped with an automatic shifting device and the vehicle is traveling uphill at maximum absorption volume for the hydraulic engine 18, then the valve 24 will be switched such that the line 25 is connected to the valve 1. As a result of the automatic shifting that takes place when the pressure in the hydraulic fluid intake 3 is above a certain level, the line 25 is held without pressure so that the valve 1 in its initial position connects all torque-generating pistons with the hydraulic fluid intake 3 via the spring 4. If the vehicle is to be held in a stationary position on an incline, then the flow of hydraulic fluid at the hydraulic fluid intake 3 is reduced until the hydraulic fluid intake 3 is nearly without pressure. Because a drop in pressure of the hydraulic fluid at the hydraulic fluid intake 3 below a certain level causes the automatic shifting to supply the line 25 with hydraulic fluid, then without the valve 24, the valve 1 would be reversed, and the vehicle would begin to move downhill until the brake 22 was engaged, or until the valve 1 was reversed to interrupt the connection of the hydraulic fluid intake 3 to the hydraulic fluid outlet 13. Because the valve 24 is positioned in front of the valve 1, when the pressure at the hydraulic fluid intake 3 drops below a certain level, the valve 24 is reversed to its initial position, and the line 25 to the valve 1 is interrupted, so that the valve 1 remains in its initial position and is not reversed. In this manner, the vehicle can be held on an incline, until the brake 22 has been engaged. If the vehicle is traveling downhill at minimum absorption volume, i.e. with a pressurized valve 1, and the hydraulic fluid intake 3 is reduced in order to allow the vehicle to come to a stop, then the valve 24 will reverse below a certain pressure level, and the valve 1 will shift into its initial position, so that the vehicle can be braked with the maximum absorption volume i.e. using all of the torque-generating pistons. Critical safety situations are thus eliminated. In order to change the direction of travel of the vehicle, the hydraulic fluid pump, not illustrated here, is connected to the hydraulic fluid return flow 13, whereby the hydraulic fluid return flow 13 becomes the hydraulic fluid intake, and the hydraulic fluid intake 3 becomes connected to the hydraulic fluid return flow, hence the hydraulic fluid will flow out via the hydraulic fluid intake 3. Because the throttles 26 and 27 are integrated into the valve 24, the hydraulic radial piston engine can be realized without critical safety situations, and an undesirable shifting shock can be prevented. A valve 38 is preferably positioned between the line 25 and the line 39, with this valve connecting the line 25, unthrottled, with the line 39, above a certain pressure level. The valve 38 is actuated against the force of a spring by the pressure from the hydraulic fluid intake 3. The valve 38 is designed such that the level of pressure required to actuate the valve 38 lies below the level of pressure for the automatic switchover valve, not illustrated here, so that if shifting is to take place on a hill at a low rpm and high intake pressure, unthrottled shifting can be achieved.

FIG. 3:

The line 28 represents the change in the cross-section 16 in FIG. 1, which changes over the stroke of the piston 12. The line 29 represents the change in the cross-section 17 in FIG. 1, which changes over the stroke of the piston 12. The line 30 represents the change in rpm of the hydraulic engine with a change in the cross-sections 16 and 17 caused by the shifting of the piston 12. The line 31 represents the output torque of the hydraulic engine shown in FIG. 1, for the torque-generating pistons over the change in the cross-sections 16 and 17 caused by a shifting of the piston 12. The line 32 represents the pressure in the second portion 8 of torque-generating pistons shown in FIG. 1, over the change in the cross-sections 16 and 17 caused by a shifting of the piston 12. The line 33 represents the pressure at the hydraulic fluid intake 3 over the change in the cross-sections 16 and 17 caused by a shifting of the piston 12. The line 34 represents the pressure at the hydraulic fluid return flow 13 over the change in the cross-sections 16 and 17 caused by a shifting of the piston 12. At the start of the shift, the piston 12 is in its initial position; it is then pressed, throttled, against the tension of the spring 4. The cross-section 16, the change in which is indicated by the line 28, is completely open at the start of the shift. The cross-section 17, the change in which is indicated by the line 29, is completely closed at the start of the shift. Starting with the shifting path 35, the cross-section 16 is reduced, and the cross-section 17 is expanded, so that the second portion 8 of the torque-generating pistons is connected almost evenly to the hydraulic fluid return flow. This causes the torque of the line 32 to drop to the line 34. Starting with the shifting path 36, the second portion 8 of torque-generating pistons is connected completely to the hydraulic fluid return flow 13, and is separated from the hydraulic fluid intake 3.

FIG. 4:

The line 28 represents the change in the cross-section 16 shown in FIG. 1, which changes over the stroke of the piston 12. The line 29 represents the change in the cross-section 17 shown in FIG. 1, which changes over the stroke of the piston 12. The line 30 represents the change in rpm of the hydraulic engine with a change in the cross-sections 16 and 17 caused by a shifting of the piston 1. The line 37 represents the output torque of the hydraulic engine over the change in the cross-sections 16 and 17 caused by a shifting of the piston 12. The line 33 represents the pressure at the hydraulic fluid intake 3 in the hydraulic engine, over the change in the cross-sections 16 and 17 caused by the shifting of the piston 12. The line 34 represents the pressure at the hydraulic fluid return flow 13 in the hydraulic engine, over the change in the cross-sections 16 and 17 caused by a shifting of the piston 12. At the start of the shift, the piston 12 is in its final position; it is then shifted, throttled, by the tension of the spring 4. The cross-section 16, the change in which is indicated by the line 28, is completely closed at the start of the shift. The cross-section 17, the change in which is indicated by the line 29, is completely open at the start of the shift. Starting with the shifting path 35, the cross-section 17 decreases, while the cross-section 16 increases, so that the second portion 8 of the torque-generating pistons is connected nearly evenly to the hydraulic fluid intake. This causes the torque of the line 32 to drop to the line 34. Starting with the shifting path 36, the second portion 8 of the torque-generating pistons is completely connected to the hydraulic fluid intake 3, and is separated from the hydraulic fluid return flow 13.

| Reference Numbers | |
|---|---|
| 1 valve | 21 line |
| 2 torque-generating piston | 22 brake |
| 3 hydraulic fluid intake | 23 line |
| 4 spring | 24 valve |
| 5 recess | 25 line |
| 6 hydraulic fluid divider | 26 throttle |
| 7 first portion | 27 throttle |

| -continued | |
|---|---|
| Reference Numbers | |
| 8 second portion | 28 line |
| 9 piston carrier | 29 line |
| 10 brake | 30 line |
| 11 chamber | 31 line |
| 12 piston | 32 line |
| 13 hydraulic fluid return flow/outlet | 33 line |
| 14 sealing point | 34 line |
| 15 side | 35 shifting path |
| 16 cross-section | 36 shifting path |
| 17 cross-section | 37 line |
| 18 hydraulic engine | 38 valve |
| 19 hydraulic engine | 39 line |
| 19 valve | |
| 20 valve | |

What is claimed is:

1. A hydraulic radial piston engine comprising:

a plurality of torque-generating pistons;

a hydraulic fuel intake (3) for supplying the plurality of torque-generating pistons with a hydraulic fluid;

a valve (1) having means for moving the valve in a reverse or forward direction, the means for moving including a chamber (11);

a sealing point contacting the valve (1) between the hydraulic fuel intake (3) and the chamber (11);

a throttle (26, 27) for feeding or removing fluid from the chamber (11) of the valve (1); and wherein, when the valve (1) is in a first position hydraulic fuel is supplied to all of the plurality of torque-generating pistons, and when the valve is in a second position only a first portion of the plurality of torque generating pistons is supplied hydraulic fuel from the hydraulic fuel intake (3) and a second portion of torque generating pistons is connected to a hydraulic fluid return flow, and when the pressure in the hydraulic fuel intake (3) is below a certain pressure level all the pistons of the plurality of torque generating pistons are connected to the hydraulic fuel intake.

2. The hydraulic radial piston engine according to claim 1, wherein the valve (1) comprises a piston (12) having cross-sections (16, 17) which change substantially evenly with the movement of the piston (12).

3. The hydraulic radial piston engine according to claim 1, wherein:

the valve (1) which connects the torque-generating pistons with the hydraulic fluid intake (3) is arranged coaxially in the hydraulic fluid intake.

4. The hydraulic radial piston engine according to claim 1, wherein:

the valve (1) is biased by a spring.

5. The hydraulic radial piston engine according to claim 1, wherein the radial piston engine drives a planetary gear to drive a construction vehicle.

6. The hydraulic radial piston engine according to claim 1, further comprising control means for controlling the position of the valve (1) independent of the throttle.

7. The hydraulic radial piston engine comprising:

a plurality of torque-generating pistons;

a hydraulic fuel intake (3) for supplying the plurality of torque-generating pistons with a hydraulic fluid;

a valve (1) having means for moving the valve (1) in a reverse or a forward direction, the means for moving including a chamber (11);

a sealing point contacting the valve (1) between the hydraulic fuel intake (3) and the chamber (11);

switching means for switching said valve to a first position such that only a first portion of said plurality of torque generating pistons is supplied hydraulic fuel from the hydraulic fuel intake (3) and a second portion of torque generating pistons is connected to a hydraulic fluid return flow, and the switching means switching the valve to a second position so that all of the plurality of torque generating pistons are connected to the hydraulic fluid intake so as to be supplied with hydraulic fluid when the pressure in the hydraulic fuel intake (3) to the torque generating pistons drops below a certain pressure level.

8. The hydraulic radial piston engine according to claim 7, wherein a throttle (26, 27) is positioned inside a second valve (24) which is positioned upstream of the valve (1).

9. A hydraulic radial piston engine according to claim 7, wherein:

when hydraulic fluid reverses the second valve (24) to reverse the valve (1), a brake (11) is applied to the hydraulic engine.

10. A hydraulic radial piston engine comprising:

a plurality of torque-generating pistons;

a hydraulic fuel intake (3) for supplying the plurality of torque-generating pistons with a hydraulic fluid;

a valve (1) having a control system for moving the valve (1) in a reverse or a forward direction, the control system including a chamber (11);

a sealing point contacting the valve (1) between the hydraulic fuel intake (3) and the chamber (11);

a throttle (26, 27) for feeding or removing fluid from the chamber (11) of the valve (1); and wherein, when the valve (1) is in a first position hydraulic fuel is supplied to all of the plurality of torque-generating pistons, and when the valve is in a second position only a first portion of the plurality of torque generating pistons is supplied hydraulic fuel from the hydraulic fuel intake (3) and a second portion of torque generating pistons is connected to a hydraulic fluid return flow, and when the pressure in the hydraulic fuel intake (3) is below a certain pressure level all the pistons of the plurality of torque generating pistons are connected to the hydraulic fuel intake.

* * * * *